United States Patent [19]
Balakrishnan et al.

[11] Patent Number: 5,973,945
[45] Date of Patent: Oct. 26, 1999

[54] COUPLED INDUCTOR POWER SUPPLY WITH REFLECTED FEEDBACK REGULATION CIRCUITRY

[75] Inventors: Balu Balakrishnan, Saratoga; William M. Polivka, Mountain View; Clifford J. Walker, Fremont, all of Calif.

[73] Assignee: Power Integrations, Inc., Sunnyvale, Calif.

[21] Appl. No.: 09/108,886

[22] Filed: Jul. 1, 1998

[51] Int. Cl.$^6$ ........................................... H02M 3/24
[52] U.S. Cl. .................................. 363/80; 363/89
[58] Field of Search .................... 363/75, 80, 89, 363/21

[56] References Cited

U.S. PATENT DOCUMENTS 4,451,876  5/1984  Ogata ........................................ 363/21
4,931,920  6/1990  Barker ........................................ 363/82

*Primary Examiner*—Shawn Riley
*Attorney, Agent, or Firm*—Blakely Sokoloff Taylor & Zafman, LLP

[57] ABSTRACT

A power supply for supplying power to a load comprises a coupled inductor having a primary winding, at least one secondary winding, and a regulation circuit coupled to the primary winding that allows current or voltage to be supplied to the coupled inductor for a time duration, An error detection circuit is coupled to the secondary winding to compare a voltage or current supplied to the load against at least one threshold. Upon exceeding the threshold, the error detection circuit alters the voltage or current at the secondary winding, which causes a reflected feedback signal to be generated. A reflected feedback regulation circuit coupled to the primary winding provides an information signal to the regulation circuit responsive to the reflected feedback signal. The information signal increases or decreases the time duration to regulate the power supplied to the load.

17 Claims, 13 Drawing Sheets

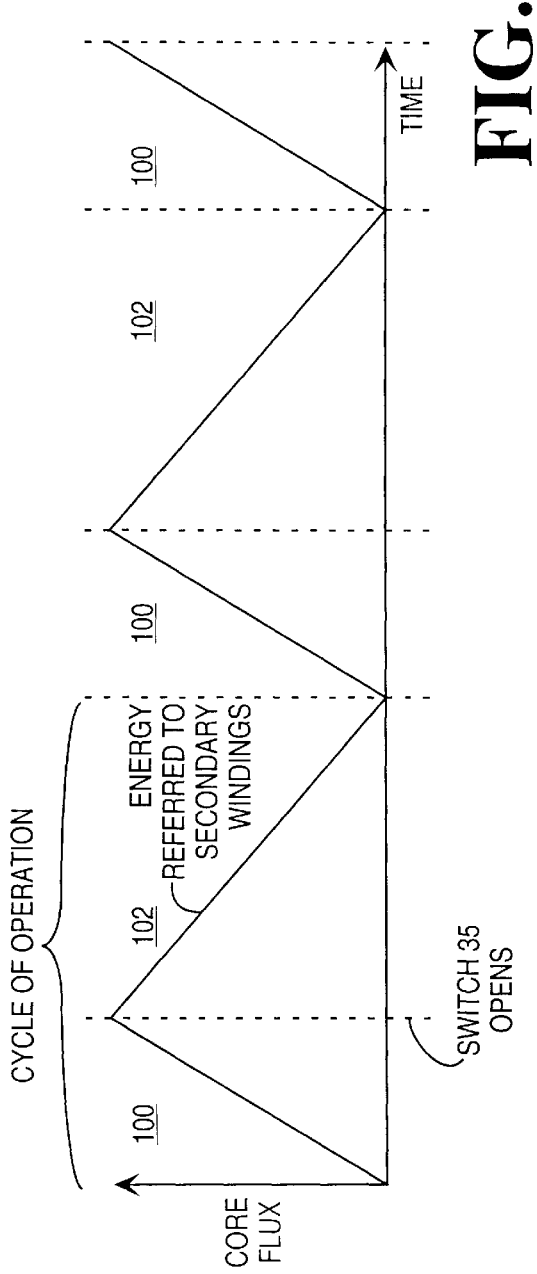
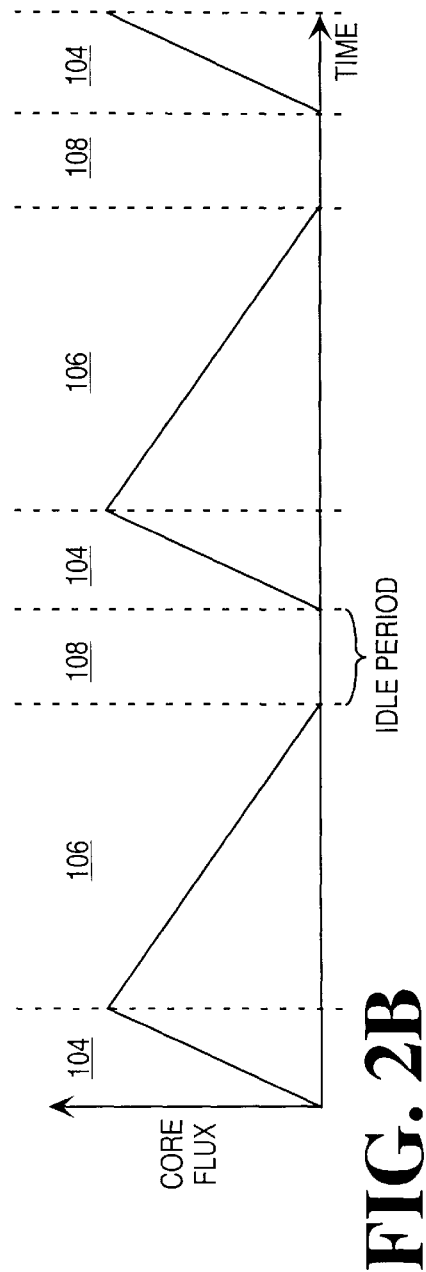

COUPLED INDUCTOR POWER SUPPLY WITH REFLECTED FEEDBACK REGULATION CIRCUITRY

BACKGROUND

1. Field of the Invention

The field of the present invention pertains to the field of power supplies and among other things to feedback for the regulation of power supplies.

2. Background of the Invention

Power supplies that convert an AC mains or a DC voltage to a DC voltage for use by integrated electronic devices, amongst other devices, are known. The power supplies are required to maintain the output voltage, current or power within a regulated range for efficient and safe operation of the electronic device. Switches that operate to maintain the output voltage, current, or power of the power supply within a regulated range are also known. Example of such switches include pulse width modulated switches. These switches utilize an oscillator and related circuitry to vary the pulse width or switching frequency of the switch, and therefore regulate the power, current or voltage that is supplied by the power supply. A switch that utilizes pulse width modulation control, utilizes feedback from the output of the power supply in order to maintain the output power, voltage or current within the regulated limits by varying its duty cycle.

A known power supply utilizing optocoupler feedback is depicted in FIG. 1. A bridge rectifier 5 rectifies an input AC mains voltage 10, which is smoothed into a substantially DC voltage 15 by power supply capacitor 20. The substantially DC voltage 15 is provided to primary winding 25 of coupled inductor 30 which is also known as a power transformer in power supply circuits. Coupled inductors 30 transfer energy according to the operation of a switch 35, that operates according to pulse width modulated control. When the switch 35 is closed it allows current to flow through primary winding 25. When switch 35 opens, current is induced in secondary winding 40. The current induced in the secondary winding 40 flows in the forward direction of diode 45 and is then filtered by secondary capacitor 50. The voltage at the secondary capacitor 50 is provided to the output of the power supply.

A feedback circuit 52 provides a signal indicative of the output voltage to the switch control circuitry 55 which then varies the duty cycle of the switch 35 with the magnitude of the signal indicative of the output voltage. The feedback circuit 52 includes a Zener diode 60 in series with a resistor 70. The resistor 70 is in series with a light emitting diode 75 of optocoupler 80. The optocoupler 80 also includes a phototransistor 85 that will allow current to flow when a current flows through light emitting diode 75. A bias winding 90, which is connected to a diode 92 and capacitor 94 supplies voltage so that a current can flow to the switch control circuitry 55 when phototransistor 85 is conducting.

The power supply of FIG. 1 or any other power supply that utilizes a coupled inductor can operate in either a continuous conduction mode or a discontinuous conduction mode. Referring to FIG. 2A, the core flux of the coupled inductor of a power supply in continuous conduction mode is depicted. During time period 100 current is flowing through the primary winding and the flux increases in the core of the coupled inductor to some level that is generally below the saturation level of the core. At the beginning of time 102, a switch such as switch 35 is opened and no further current is provided through the primary winding. During time 102 energy is delivered to one or more secondary windings that are coupled through the core with the primary winding. At the end of time 102, the flux in the core is greater than or equal to zero. The actual flux level that is stored at the end of time 102 is a function of the inductance of the core, the flux that was stored in the core during time 100 and the length of time 102. The combined times 100 and 102 are referred to as a cycle of operation of the power supply. Continuous conduction mode is generally utilized for high power consumption applications.

Referring to FIG. 2B, the core flux of the coupled inductor of a power supply operating in discontinuous conduction mode is depicted. During time 104 a current flows in the primary winding and flux in the core is increasing. At the beginning of time 106, a switch such as switch 35 is opened and no further current is provided through the primary winding. During time 106 energy is transferred to one or more secondary windings and the flux stored in the core is reduced. At the end of time 106 all the energy stored in the core has been transferred to the secondary winding and flux in the core is essentially zero. During time 108 no energy is transferred across the coupled inductor and the coupled inductor is idle. Discontinuous conduction mode generally occurs in low power consumption applications. Other power supply configurations can have an idle period of essentially zero flux in the transformer even in high power consumption applications.

A problem associated with the power supply of FIG. 1, regardless of whether it operates in continuous or discontinuous conduction mode, includes the addition of a bias winding 90, diode 92, capacitor 94 and optocoupler 80 which add to the cost and size of the power supply.

An additional problem associated with the power supply of FIG. 1 is that using an optocoupler 80 may result in unreliable isolation between the light emitting diode 75 and phototransistor 85 which are a relatively short distance apart and have a visual path between them. This arrangement of the light emitting diode 75 and phototransistor 85 may cause a short circuit between the light emitting diode 75 and phototransistor 85. If a short circuit occurs in the optocoupler then there is also a short circuit between the primary winding and secondary winding. Under these circumstances, the user of an electronic device which utilizes the power supply may be injured since the potentially lethal voltage at the primary side of the power supply is applied to the secondary side and potentially to the user. This issue is further problematic since it is difficult to test the isolation of an optocoupler once it is in the power supply. Furthermore, the optocoupler's isolation may fail without indication after the power supply leaves the factory. The quality of the isolation provided by the optocoupler is a function of its cost. Therefore, for low cost applications the use of an optocoupler can be problematic and will add to the cost of the electronic device.

SUMMARY OF THE INVENTION

In one embodiment the present invention comprises a method for regulating a power supply comprising providing an excitation signal through a coupled inductor to a secondary winding, determining a magnitude of an output signal that results from the excitation signal, providing a detection signal through the coupled inductor, detecting a reflected component of the detection signal, and varying the energy provided to the primary winding in response to the reflected component.

In a further embodiment a method for regulating a power supply comprises determining a magnitude of an output signal at an output of a power supply, comparing the magnitude of the output signal to a threshold level, switching the state of a circuit to a first state if the magnitude is above the threshold level and to a second state if the magnitude is below the threshold level, detecting whether the circuit is in the first or second state based upon a reflected signal, and varying the energy provided to a primary winding in response to reflected signal.

In another embodiment a method for regulating a power supply comprising a primary winding and a secondary winding. The method comprises determining a magnitude of an output signal, varying a magnitude of a variable impedance, measuring the magnitude of the impedance by determining a magnitude of a reflected signal, and varying a magnitude of the output signal based upon the determination of the magnitude of the reflected signal.

In an additional embodiment the present invention comprises a power supply comprising a first winding coupled to receive energy, a second winding magnetically coupled with the first winding, a switch that allows energy to be transferred to the first winding in a first state and preventing energy transfer to the first winding in a second state according to a duty cycle, a current limiting circuit that puts the switch in the second state when a magnitude of a current in the primary winding is above a threshold, and a variable impedance varying in magnitude according to a magnitude of an output signal of the power supply.

In yet another embodiment the present invention comprises a power supply comprising a first winding that receives a substantially DC signal, a second winding magnetically coupled to the first winding, the second winding supplying power to an output of the power supply, a reflected feedback regulation circuit coupled with the primary winding, a variable impedance coupled with the second winding, the variable impedance varying in magnitude according to a magnitude of an output signal of the power supply.

It is an object of an aspect of the present invention to create a power supply that minimizes the possibility of creating a short circuit between a voltage input and a regulated output.

It is another object of an aspect of the present invention to create a power supply that has accurate regulation of the output voltage, current or power.

It is yet another object of an aspect of the present invention to create a power supply that is low cost.

These and other objects and aspects of the present inventions are taught, depicted and described in the drawings and the description of the invention contained herein.

BRIEF DESCRIPTION OF THE DRAWINGS

FIG. 2A is a diagram of the flux variation in the core of a coupled inductor when operating in continuous conduction mode.

FIG. 2B is a diagram of the flux variation in the core of a coupled inductor when operating in discontinuous conduction mode.

DESCRIPTION OF THE PREFERRED EMBODIMENT

Figure 3:
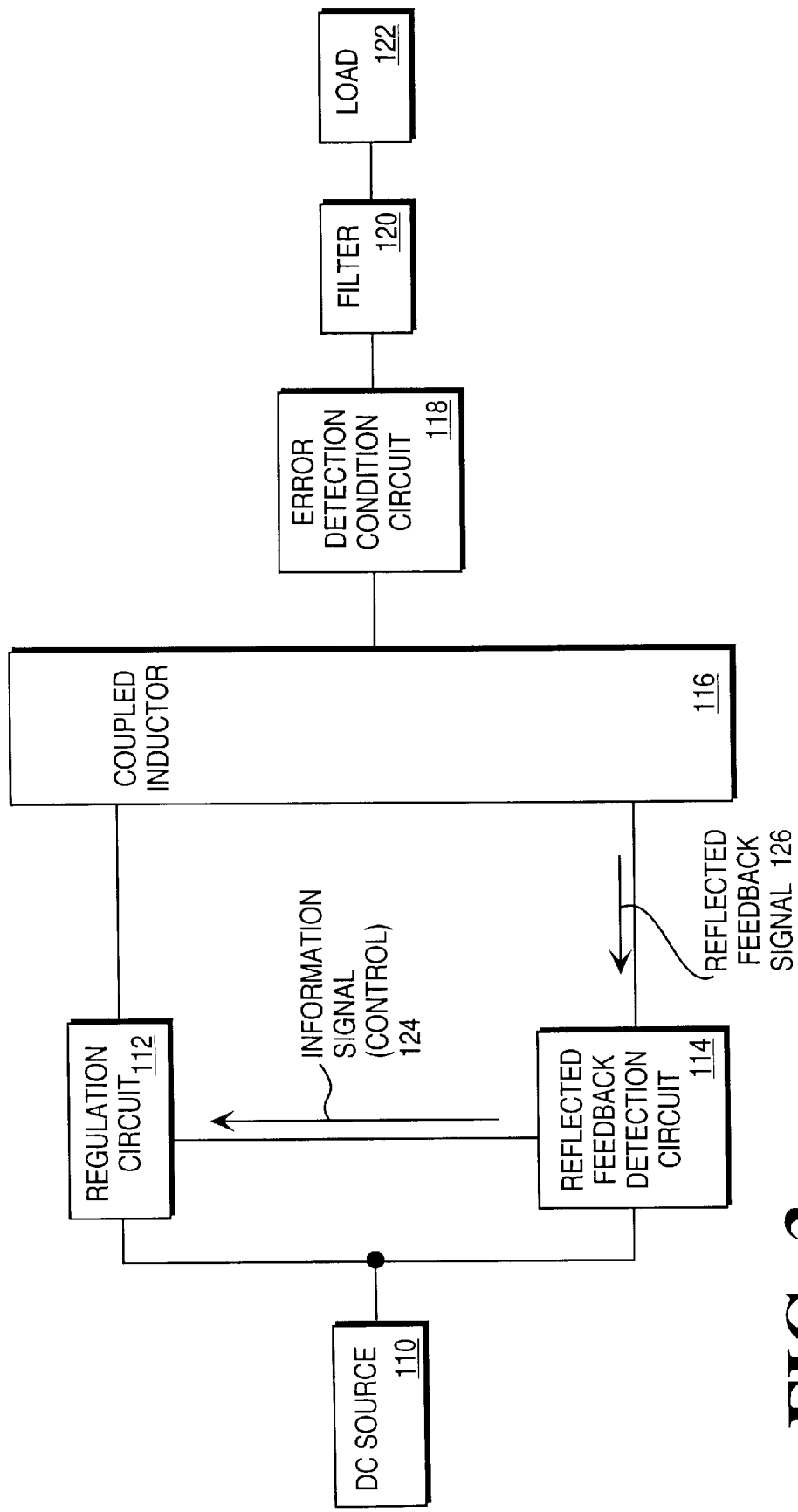
FIG. 3 is a block diagram of a presently preferred power supply that utilizes reflected feedback according to the present inventions.

Referring to FIG. 3, DC source 110 provides DC current and voltage. DC source 110 can be a rectifier, battery, or other circuit capable of providing DC power. The voltage and current from DC source 110 is supplied to coupled inductor 116, which can also be referred to as a power transformer. The duration of the voltage or current that is supplied to the coupled inductor is regulated by a regulation circuit 112, which allows current or voltage to be supplied from the DC source 110 to the coupled inductor for a period of time, which can for example be time period 100 (FIG. 2A) or 104 (FIG. 2B). For the remaining time duration of the cycle regulation circuit 112 prevents voltage or current from being supplied to the coupled inductor 116. The regulation circuit 112 can for example be a switch that operates according to a pulse width modulated signal as is known in the art. Alternate schemes include shunt resistances that shut the current from the primary winding as well as other known schemes.

On the secondary side of coupled inductor 116 there exists a error detection condition circuit 118. Error detection condition circuit 118 includes circuitry that compares the voltage, current or power provided to load 122 against one or more thresholds. The thresholds can comprise an upper limit threshold, an upper limit or lower limit thresholds or any number of thresholds that can be utilized to regulate the output of the power supply.

If the output voltage, current or power is outside the desired threshold the error detection condition circuit 118 will alter its state. The alteration in state will change either the current or voltage at the secondary of the coupled inductor 116 and will cause the primary side voltage or current to change. The change in the primary voltage or current will be provided as reflected feedback signal 126. The reflected feedback signal 126 can be used to greatly increase the primary side current or voltage if the coupled inductor is transferring flux. The reflected feedback signal 126 can also simply provide a signal when no signal is expected, e.g. causing a spike in the voltage or current during the time there is no flux in the coupled inductor if the power supply is operating in discontinuous conduction mode. The reflected feedback signal 126 is detected by reflected feedback detection circuit 114. That determines whether the reflected feedback signal 126 is above or below any of the thresholds of the reflected feedback detection circuit. The reflected feedback detection circuit 114 can be for example a current limit circuit or a voltage limit circuit. The reflected feedback detection circuit 114 can then provide an information signal 124 to the regulation circuit 112 to control its operation. The information signal 124 can be used to instruct the regulation circuit to increase or decrease the amount of time in each cycle that it allows voltage or current to be provided to the coupled inductor 116, to increase or decrease the length of each cycle, to prevent the voltage or current to be provided to the coupled inductor for a fixed or variable period of time, or any other function that can be used to regulate the load. The reflected feedback detection signal 126 can be received on either the primary winding that is providing the energy to the core or through an auxiliary winding that is magnetically coupled to the secondary and wound around the same core as the primary and secondary windings.

The regulation circuit 112 and reflected feedback detection circuit 114 can be part of a single integrated monolithic device or be separate circuits.

A filter circuit 120 is utilized to maintain the voltage and current supplied to the load in a substantially DC state and to prevent transients in either the power supply or power grid from propagating to the load.

Figure 4:
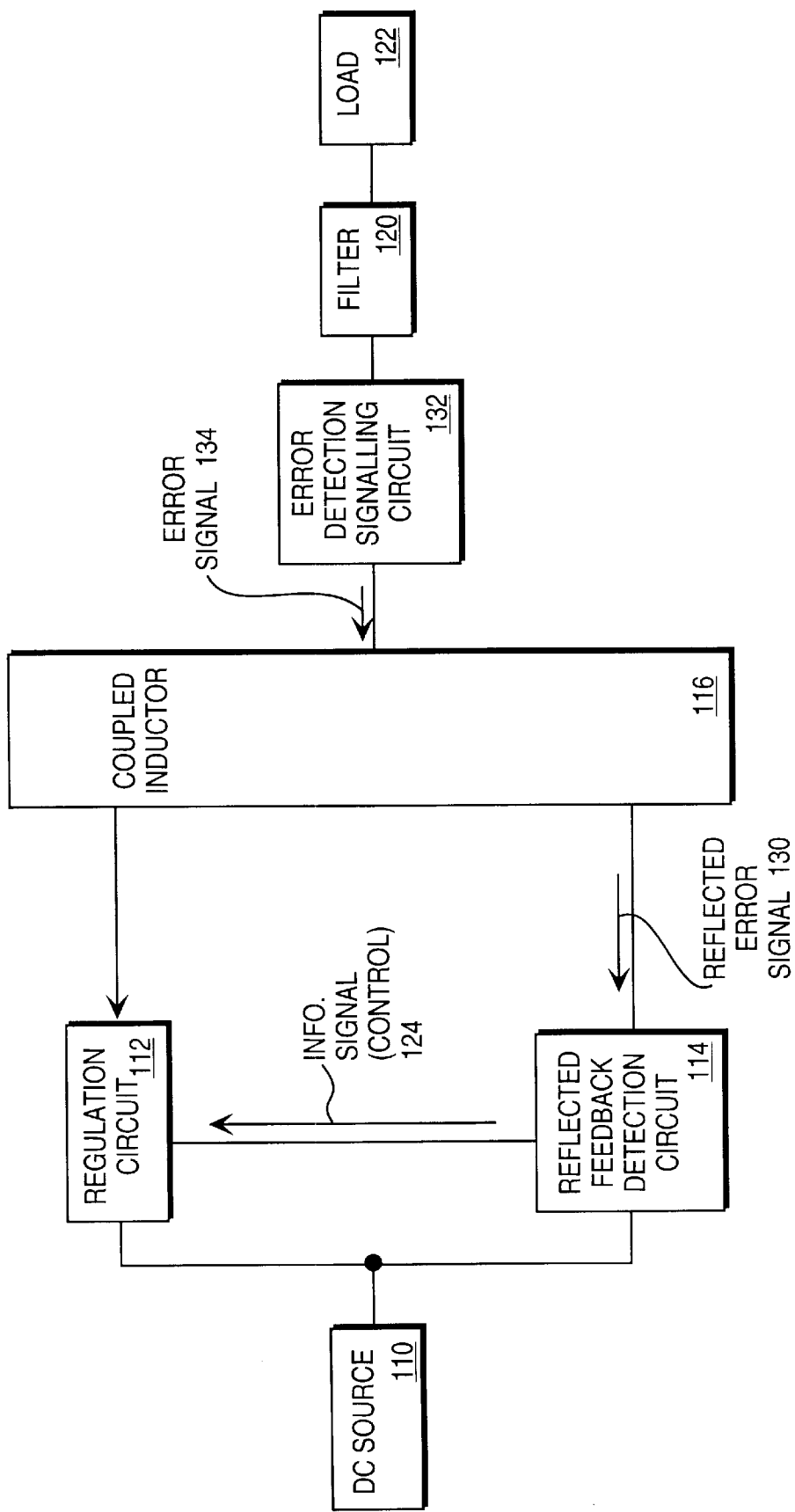
FIG. 4 is a block diagram of an alternate preferred power supply utilizing reflected feedback according to the present inventions.

Referring to FIG. 4, the DC source 110, regulation circuit 112, coupled inductor 116, filter 120 and load 122 operate as described with respect to FIG. 3. The error detection condition circuit 118 is replaced with an error detection signaling circuit 132 and reflected feedback detection circuit 114 is replaced with an error signal detection circuit 128. In operation, error detection signaling circuit 132 includes circuitry that compares the voltage, current or power provided to load 122 against one or more thresholds where the thresholds may be an upper limit threshold, an upper limit and lower limit thresholds or any number of thresholds that can be utilized to regulate the output of the power supply. If the output voltage, current or power is outside the threshold limits the error detection signaling circuit can provide an error signal 134 to the secondary winding of the coupled inductor 116 that indicates which of the thresholds is out of regulation and even how much the output voltage, current or power is outside of the regulated threshold. As more and more information is required to be transmitted as part of error signal 134, the complexity of the error detection signaling circuit 132 will increase, e.g., adding additional comparison logic circuits to detect each different threshold. Error signal 134 can be for example a radio frequency signal, a high or low magnitude voltage or current, or a pulse of a known duration. The error signal 134 is reflected across the coupled inductor 116 and is transformed into reflected error signal 130. Reflected error signal 130 is then detected by reflected error detection circuit 128. The reflected error detection circuit 128 is designed with circuitry that will detect the same type of signal as error signal 134. The reflected error signal 130 can be received on either the primary winding that is providing the energy to the core or through an auxiliary winding that is magnetically coupled to the secondary and wound around the same core as the primary and secondary windings. It is presently preferred if a high frequency or radio frequency signal is used that the reflected error signal 130 be reflected from an auxiliary winding.

The regulation circuit 112 and reflected error detection circuit 128 can be part of a single integrated monolithic device or be separate circuits.

Figure 5:
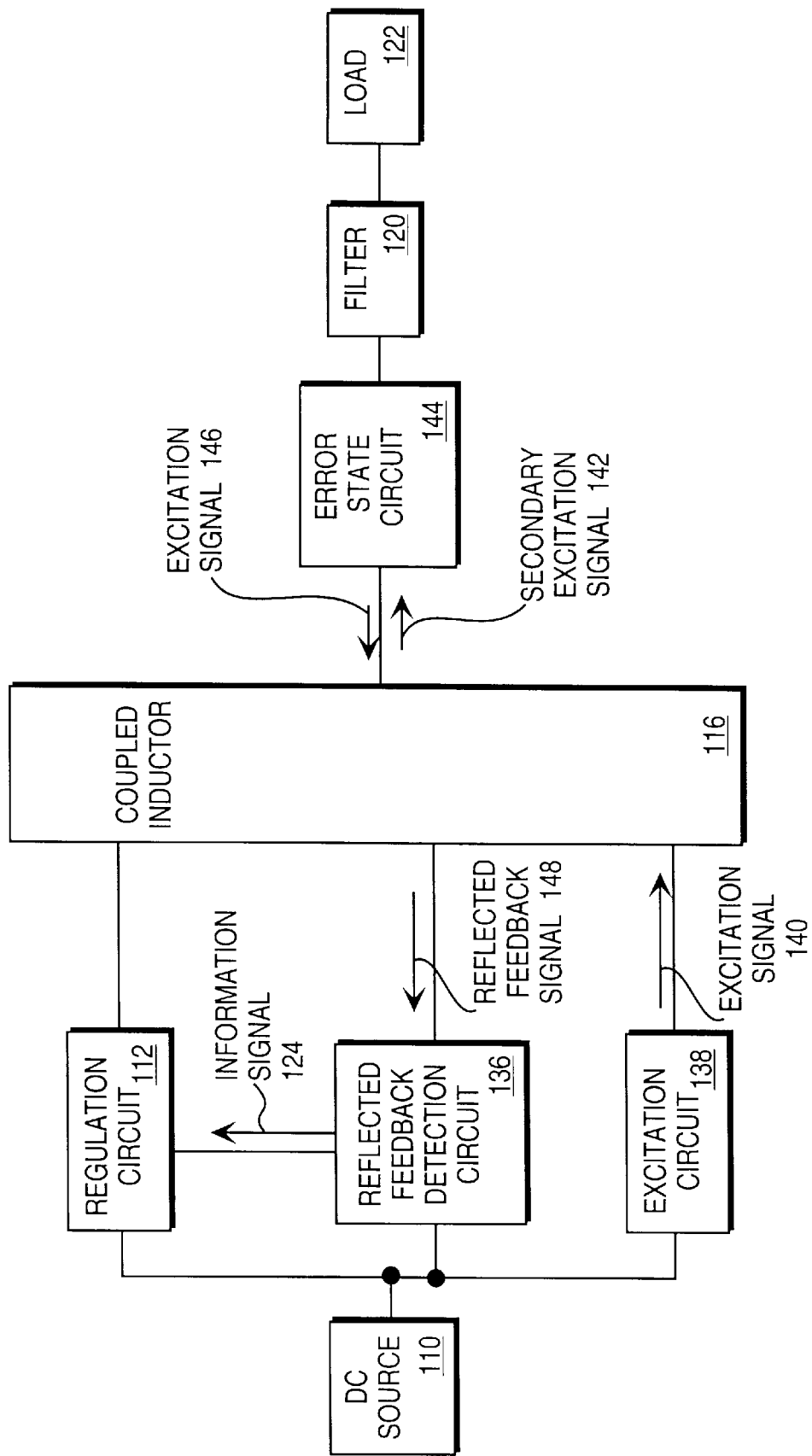
FIG. 5 is a block diagram of another alternate presently preferred power supply that utilizes reflected feedback according to the present inventions.

Referring to FIG. 5, the DC source 110, regulation circuit 112, coupled inductor 116, filter 120 and load 122 operate as described with respect to FIG. 3. An excitation circuit 138 provides an excitation signal 140, presently preferred to be a low amplitude radio frequency signal, to either a primary or auxiliary winding that are part of coupled inductor 116. The excitation signal 140 is reflected to the secondary as secondary excitation signal 142. Which is provided to error state circuit 144. Error state circuit 144 can either change its state similar to error detection condition circuit 118 or provide a signal similar to error detection signaling circuit 132. Either way, error state circuit 144 detects a voltage, current or power at the output of the power supply that results from the secondary excitation signal 142. If the output voltage, current or power is outside some predetermined threshold the error state circuit can change its state or provide an error signal 146. If the error state circuit 144 changes its state, the feedback method is the same as described with respect to FIG. 3, the error signal 146 is omitted, reflected feedback signal 148 can be similar to reflected feedback detection signal 126 and reflected feedback detection circuit 136 is similar to reflected feedback detection circuit 114. If the error state circuit 144 provides an error signal 146 then the reflected error signal 148 and reflected feedback circuit 136 would function in the manner as described with respect to reflected error signal 130 and error signal detection circuit 128 respectively.

Figure 1:
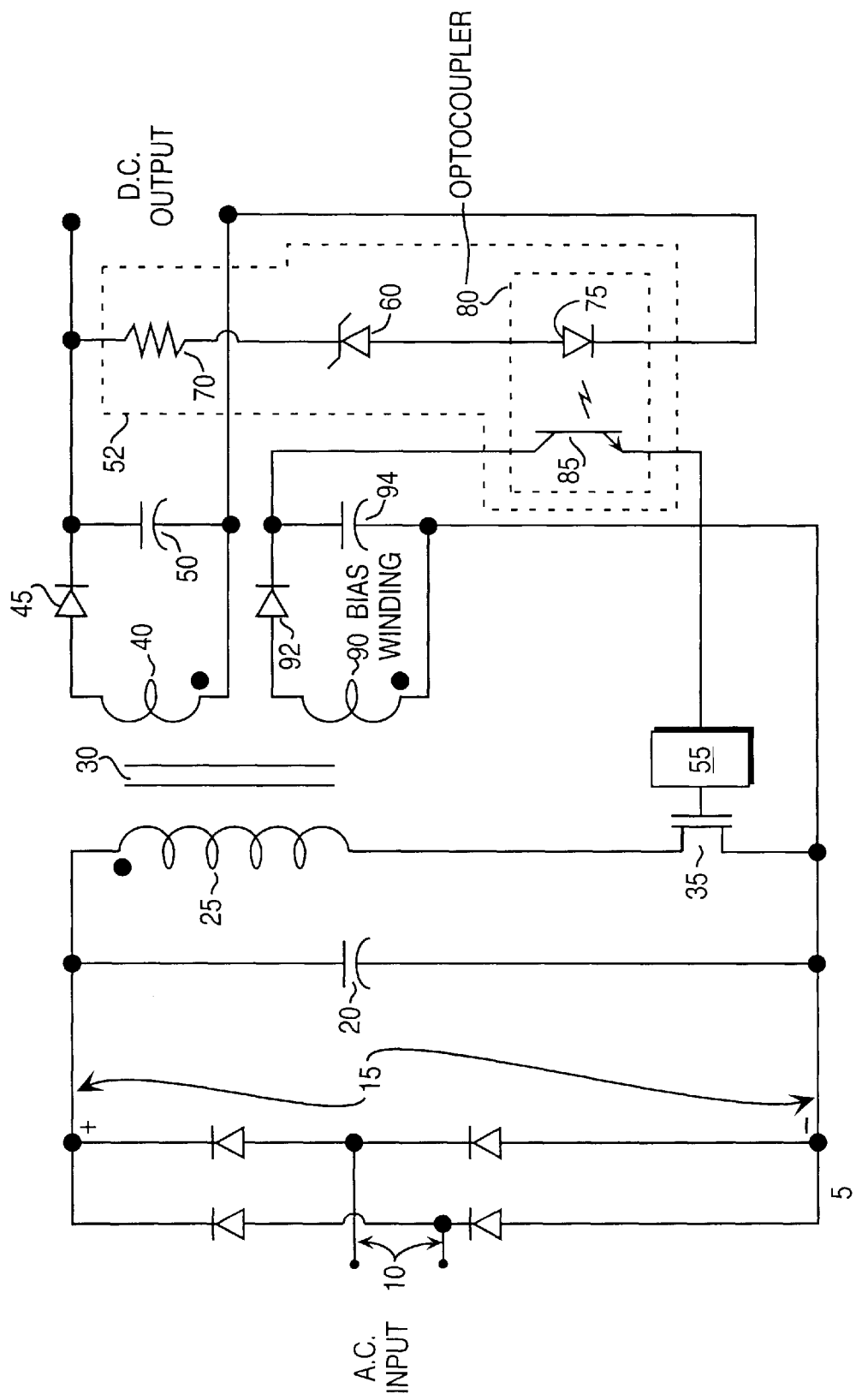
FIG. 1 is a known power supply utilizing a pulse width modulated switch and optocoupler feedback.

An advantage of the power supplies of FIGS. 3, 4, and 5 over that in FIG. 1 is that FIGS. 3, 4 and 5 have no circuitry other than a coupled inductor between the primary side of the power supply and the secondary side of the power supply, which results in reliable isolation between the primary and secondary sides. This greatly reduces the chance for a short circuit from the primary to the secondary and injury to a user of the device to which the power supply is attached. Further, the removal of the optocoupler 80 reduces the cost of the power supply. With the use of reflected feedback, the regulation of the output is as accurate as the feedback provided by the utilization of an optocoupler.

Figure 6:
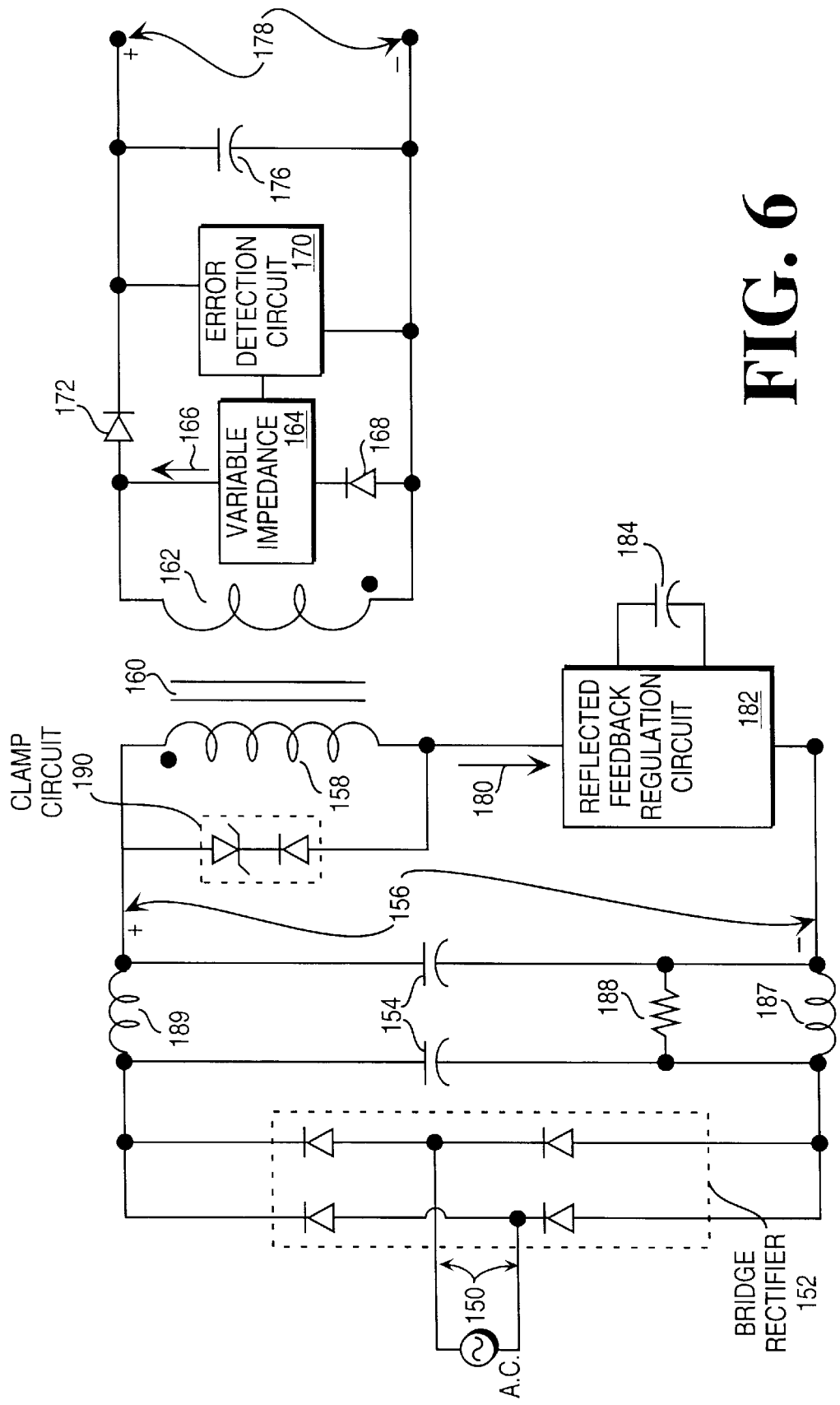
FIG. 6 is a circuit diagram of one presently preferred power supply utilizing reflected feedback according to present invention.

Referring to FIG. 6, AC mains voltage 150 is rectified by bridge rectifier 152. The rectified signal is provided to power supply capacitors 154, that function as energy storage elements, which provide a substantially DC signal 156. The substantially DC signal 156 is provided to the primary winding 158 of coupled inductor 160 that stores the energy provided to the primary winding 158. When the primary winding 158 stops receiving energy, energy is delivered to the secondary winding 162. A current induced in the secondary winding 162 flows in the forward direction of diode 172 and then is transformed into secondary substantially DC signal 178 by secondary capacitor 176. The energy is then provided to the power supply output.

Current is no longer provided to the primary winding 158 when a reflected feedback regulation circuit 182, which is coupled to the primary winding 158, does not conduct. Reflected feedback regulation circuit 182 is presently preferred to include a switch that is capable of operating according to either fixed or variable frequency. Reflected feedback regulation circuit 182 changes between conduction and non-conduction states according to its duty cycle when the voltage, current or power at the output of the power supply does not exceed a threshold value, by obtaining feedback that is a function of the magnitude of the voltage, current or power at the output of the power supply through the primary winding 158. Reflected feedback regulation circuit 182 receives power during its conduction states in each cycle of operation from reflected feedback regulation power supply capacitor 184. Reflected feedback regulation circuit power supply capacitor 184 is charged during the time periods when reflected feedback regulation circuit 182 is not conducting by way of a current that is received through the reflected feedback regulation circuit 182.

Feedback information regarding the output of the power supply is accomplished by utilization of a variable impedance 164. Variable impedance 164 is presently preferred to alternate between either a substantially short circuit condition or substantially open circuit condition. However, the variable impedance 164 need not be limited to one that has only an open circuit or short circuit condition. All that is necessary is that variable impedance 164 be able to vary between at least two states that vary substantially in magnitude. The selection of the open circuit or short circuit condition is based upon the comparison of an output voltage, current or power with a reference signal representing an output threshold level that is presently preferred to be the regulated voltage, current or power that is desired to be provided by the power supply. If the output feedback signal is above the threshold level then a short circuit condition is induced in the variable impedance 164 and if the output feedback signal is below the threshold level then an open circuit condition is induced in the variable impedance 164. The determination of whether the output voltage, current or power is above or below a predetermined threshold is performed by an error detection circuit 170.

In the embodiment of FIG. 6, error detection circuit 170 determines whether a signal that is a function of the output voltage is above or below a desired threshold level. However, the present invention is not to be limited to voltage feedback only. For instance, feedback regarding the output current or power as is known in the art, may be used to vary the magnitude of variable impedance 164.

When variable impedance 164 is in the short circuit condition, the variable impedance current 166, in the forward direction of diode 168, through the variable impedance 164 will have a greater magnitude compared to the variable impedance current 166 when the variable impedance 164 is in a substantially open circuit condition. The variable impedance current 164 also flows through the secondary winding 162 and is then reflected back into the primary winding 158 as a component of the primary current 180 when reflected feedback regulation circuit 182 is conducting. The primary winding current 180 flows into the reflected feedback regulation circuit 182, which can compare the magnitude of the primary winding current 180 with a reference signal. If the magnitude of the primary winding current 180 is above the current threshold level, the reflected feedback regulation circuit 182 ceases conduction, which in turn prevents energy from being further input into coupled inductor 160 resulting in a minimum amount of energy being stored in coupled inductor 160. Coupled inductor 160 will deliver the remaining stored energy to secondary winding 162. With the energy delivered to the secondary limited to a minimum, the output voltage of the power supply will fall. At some point the feedback signal received by error detection circuit 170 will fall below the desired threshold level. At this point the variable impedance 164 will be switched to the substantially open circuit condition which then greatly reduces the current flowing through the variable impedance 164. The reduction in the variable impedance current 166 will also reduce the reflected current component of the primary winding current 180 when reflected feedback regulation circuit 182 conducts.

In operation, it is presently preferred that the current limit threshold is reached in each cycle of operation that the reflected feedback regulation circuit 182 is conducting whether the variable impedance 164 is in the substantially open circuit condition or the short circuit condition. When the variable impedance 164 is in the short circuit condition the current limit threshold should be reached within a far shorter period of time than when the variable impedance 164 is in the substantially open circuit condition. This will result in much less energy being transferred to the secondary winding 162 when the variable impedance is in the substantially short circuit condition.

The reflected feedback regulation circuit 182 of FIG. 6 utilizes a single current limit threshold, i.e. the current limit circuitry, which allows for the accurate regulation of the output voltage, current or power because once the output is above the threshold only minimum energy will be delivered to the output of the power supply and when the output is below the threshold energy will be delivered until the output current, voltage or power rises above the output threshold. For instance, the secondary winding voltage can be measured by utilizing a voltage divider and comparator.

Additionally, the power supply of FIG. 6 utilizes a clamp circuit 190 that is used to protect the reflected feedback regulation circuit 182 from overvoltages and a resistor 188, inductors 187 and 189 each of which are utilized to reduce the electromagnetic interference (EMI) produced by the power supply.

Figure 7:
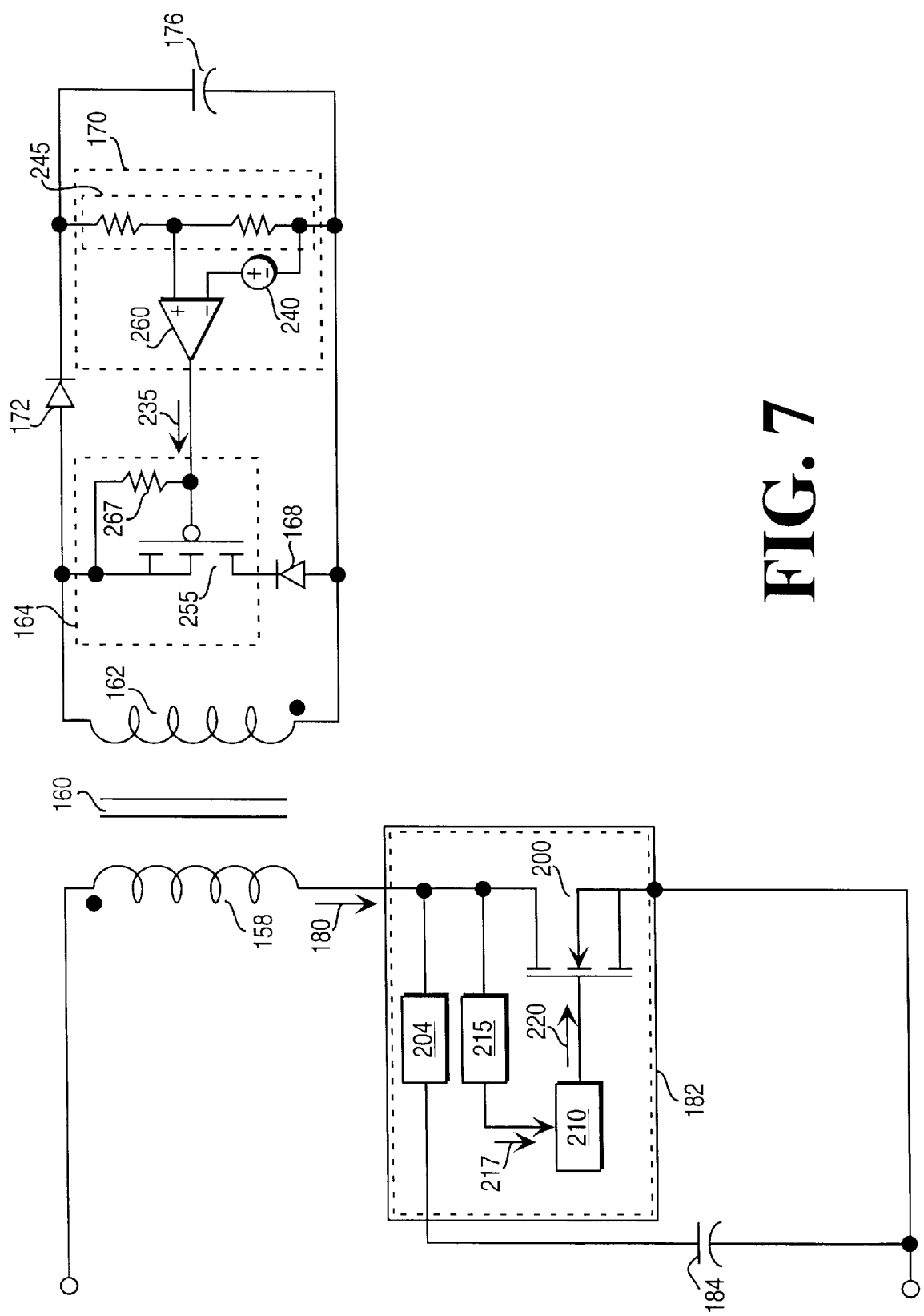
FIG. 7 is a more detailed circuit diagram of the presently preferred power supply utilizing reflected feedback according to the present invention.

Referring to FIG. 7, reflected feedback regulation circuit 182 is presently preferred to comprise a switch 200, which may be implemented as a MOSFET, control circuitry 210, a current limit circuit 215 and a bypass regulator 204. The switch 200 operates at a duty cycle according to a drive signal 220 provided by the control circuitry 210. The current limit circuitry 215 generates a current over threshold signal 217 when the primary winding current 180 rises above the threshold level. This current over threshold signal 217 in turn instructs the control circuitry 210 to remove drive signal 220, which causes switch 200 to cease conducting. The reflected feedback regulation circuit 182 will not conduct again until the next conduction state of the next cycle of the reflected feedback regulation circuit 182. The current over threshold signal 217, once generated, stays effective through the present cycle and is reset at or before the beginning of the next cycle. Power is supplied to the reflected feedback regulation circuit 182 by reflected feedback regulation circuit power supply capacitor 184 which receives a current through bypass circuit 204 when the switch 200 is not conducting.

The current limit circuit 215 shown in FIG. 7 is coupled to the drain of the switch 200. An alternate approach that senses source current of switch 200 may be utilized as is known in the art.

Variable impedance 164, which preferably comprises a transistor 255, will switch between a substantially open circuit condition and a substantially short circuit condition based upon a control current 235 provided from error detection circuit 170 which comprises a voltage divider 245 and comparator 260. The comparator 260 compares a voltage proportional to the voltage provided to the output of the power supply by the secondary capacitor 176 to a threshold voltage 240. The proportional voltage is obtained by use of voltage divider circuit 245. The control current 235 is generated by comparator 260 which stays low until the output voltage rises over the threshold level at which time it will go high. Once the control current 235 goes high transistor 255 will go to a low impedance state, which will allow it to conduct. As explained with respect to FIG. 6, when the variable impedance is conducting the reflected current component of primary winding current 180 will be high, terminating conduction by the reflected feedback regulation circuit 182.

A resistor 267 is utilized in order to determine the gate to source voltage of transistor 255. Diode 168 determines the direction of the current flow from the transistor 255 of the variable impedance 164.

The variable impedance 164 utilized need not be limited to one that operates in either a substantially open circuit or short circuit state. For example, variable impedance 164 can switch between multiple states each corresponding to a different level of the output voltage, current or power. Each of these multiple states will induce different levels of primary current 180, which can be provided to the reflected feedback regulation circuit 182. Reflected feedback regulation circuit 182 can then use each of the different magnitudes to hold the switch 200 in the second (conduction) state for different periods of time or to change its frequency of operation based upon the magnitude.

Figure 8:
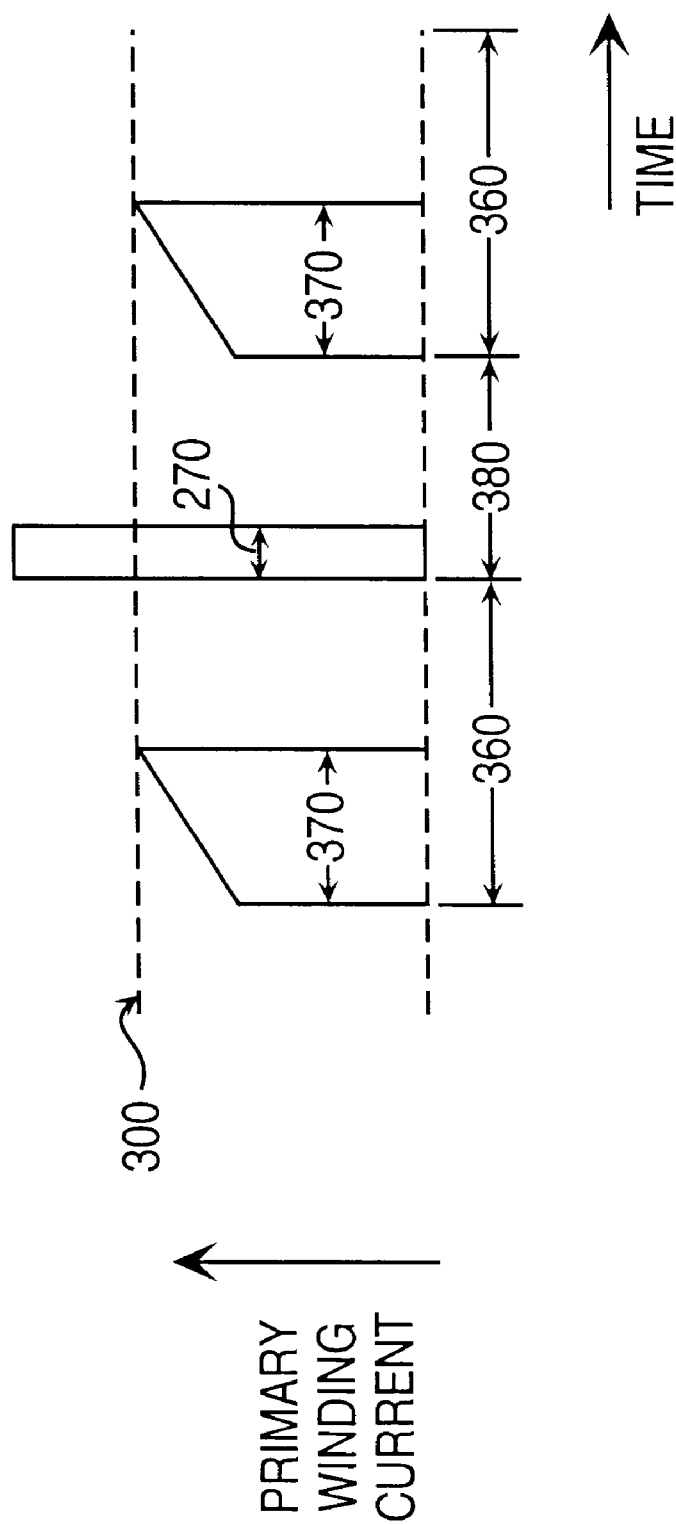
FIG. 8 is a timing diagram of signals generated within the presently preferred power supply of FIG. 7 according to the present inventions.

Referring to FIG. 8, primary winding current 180 will rise during the time period 370 in the first portion of the cycle 360 of operation of reflected feedback regulation circuit 182 when it conducts. The rate of rise is determined by the magnitude of the substantially DC voltage divided by the inductance of the primary winding 158. When the primary winding current 180 reaches the current threshold level 300, conduction of the reflected feedback regulation circuit 182 is disabled and primary winding current 180 falls nearly instantaneously to zero. In the following cycle 380, it is assumed that the variable impedance 164 is in a substantially short circuit state. As the variable impedance 164 conducts in a substantially short circuit state, the effective primary inductance of the coupled inductor 160 becomes small, which results in an increased rate of rise for the primary winding current 180. When the reflected feedback regulation circuit 182 starts to conduct at the beginning of cycle 380, the primary winding current 180 almost instantaneously exceeds the threshold level 300, which results in a short duration conduction time 270 in second cycle 380. Thus, the time for conduction of reflected feedback regulation circuit 182 will be extremely short in each cycle as long as the variable impedance 164 is in a substantially short circuit state, thereby regulating the output of the power supply.

Figure 9:
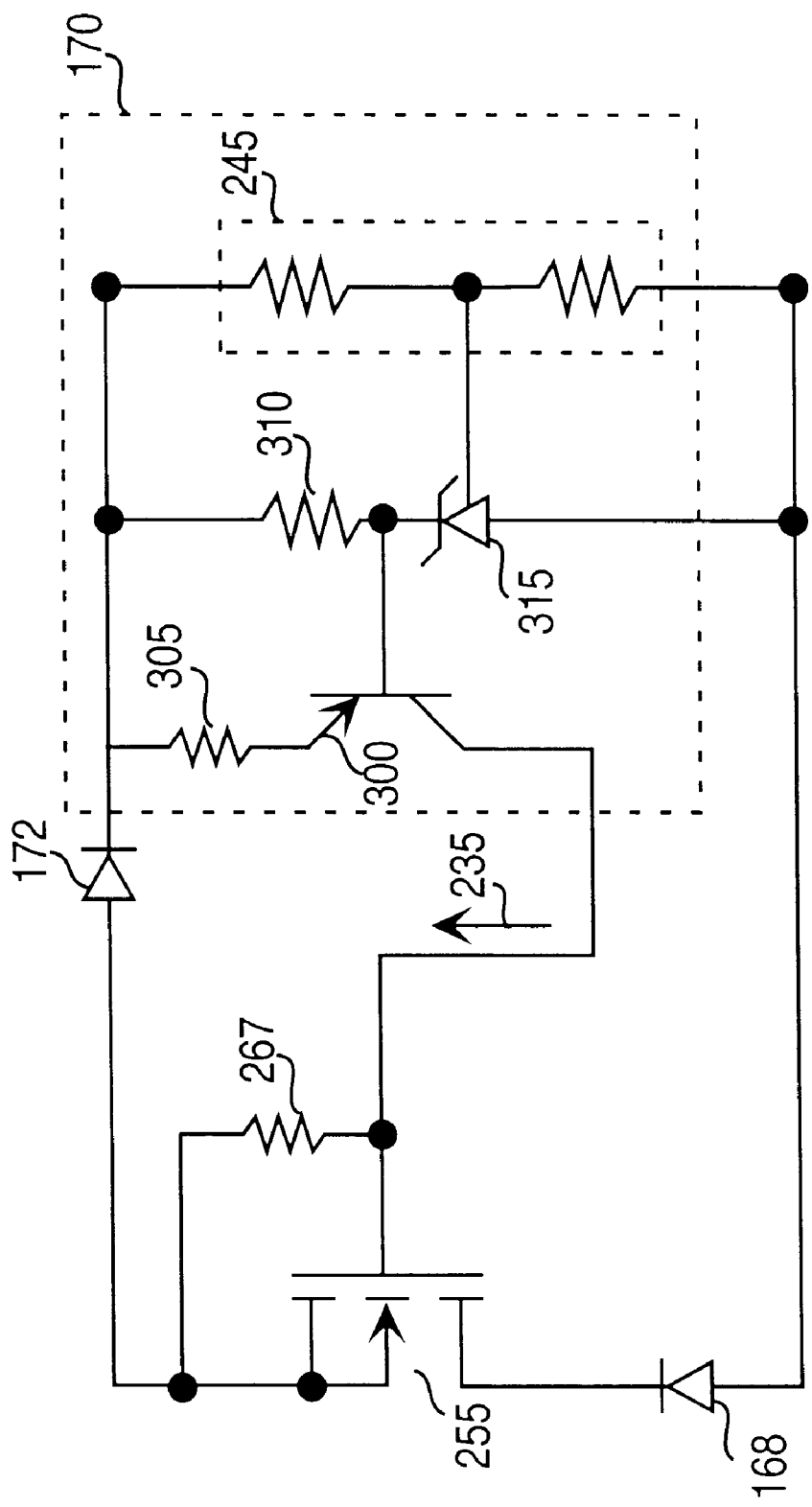
FIG. 9 is a presently preferred variable impedance and control circuitry according to the present inventions.

Referring to FIG. 9, a preferred comparator 260 comprises shunt regulator 315, resistor 310, transistor 300 and resistor 305. The transistor 300 will allow a current to flow to the resistor 267 which produces sufficient voltage to turn on transistor 255. A TL431 adjustable precision shunt regulator 315 manufactured by Texas Instruments, will conduct when the voltage provided to it through the voltage divider is above its built in reference voltage. Once the shunt regulator 315 begins conduction the transistor 300 will begin conduction which will turn on transistor 255 which regulates the output of the power supply.

Figure 10:
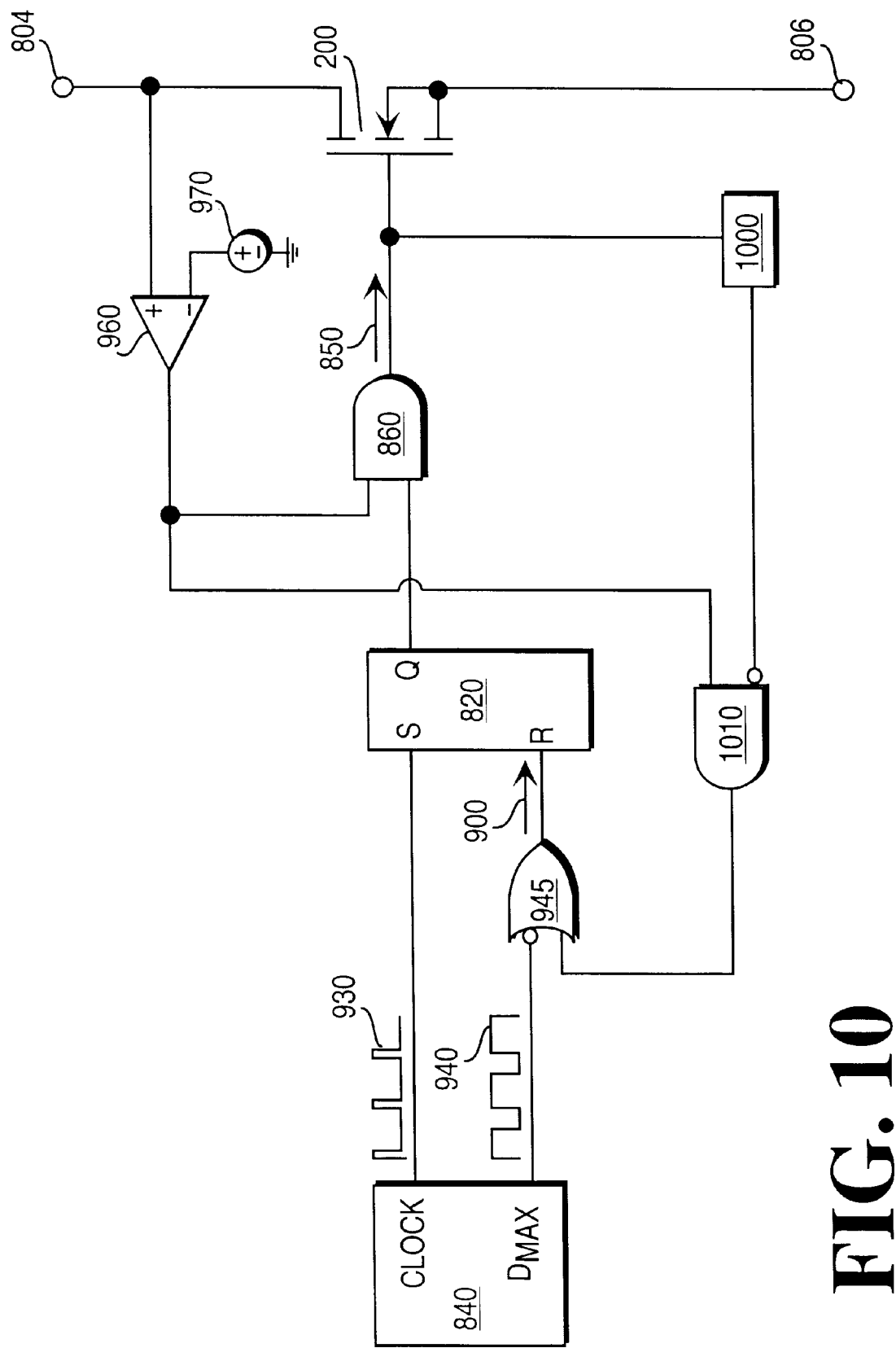
FIG. 10 is a diagram of a presently preferred reflected feedback regulation circuit of FIGS. 6 and 7 according to the present inventions.

Referring to FIG. 10, a presently preferred reflected feedback regulation circuit 182 comprises a switch 200 that is coupled between a drain terminal 804 and a source terminal 806. Switch 200 is switched on and off according to a drive signal 850 input into its gate by and-gate 860. The input of and-gate 860 comprises an output of latch 820 and from current threshold comparator 960. Maximum duty cycle signal 940 determines the maximum time that switch 200 can conduct in each cycle of operation.

Blanking circuit 1000 will provide a blanking signal to the and-gate 1010 for a fixed time period, presently preferred to be one hundred (100) nanoseconds, after the start of drive signal 850.

The inputs to first latch 820 include an or-gate output signal 900 and clock signal 930. Or-gate output signal 900 is provided by or-gate 945 when the current threshold limit 970 is reached or during the time when maximum duty cycle signal 940 is low. In operation or-gate output signal 900 will be high in order to turn off the switch 200.

Current threshold limit monitoring is performed by current threshold comparator 960 that compares the voltage level across the switch 200 on-resistance while switch 200 is conducting. If that voltage is above the current threshold limit voltage 970 the current limit signal is triggered and the switch 200 is turned off and then will not begin conducting until the beginning of the next on-time when no current limit signal is provided.

In certain situations the variable impedance 164 may be in the substantially short circuit condition for a number of continuous cycles of the operation of the reflected feedback regulation circuit 182. This may occur if the load is reduced or removed from the output of the power supply. In these situations a minimal amount of power will still be provided to the output of the power supply. This power is not useful and will result in power that is consumed unnecessarily. Also, power will be consumed through losses in the primary circuits. To improve the efficiency of the power supply it is possible to maintain switch 200 in the off-state for a predetermined number of cycles after the circuitry determines that the output requires no more energy.

Figure 11:
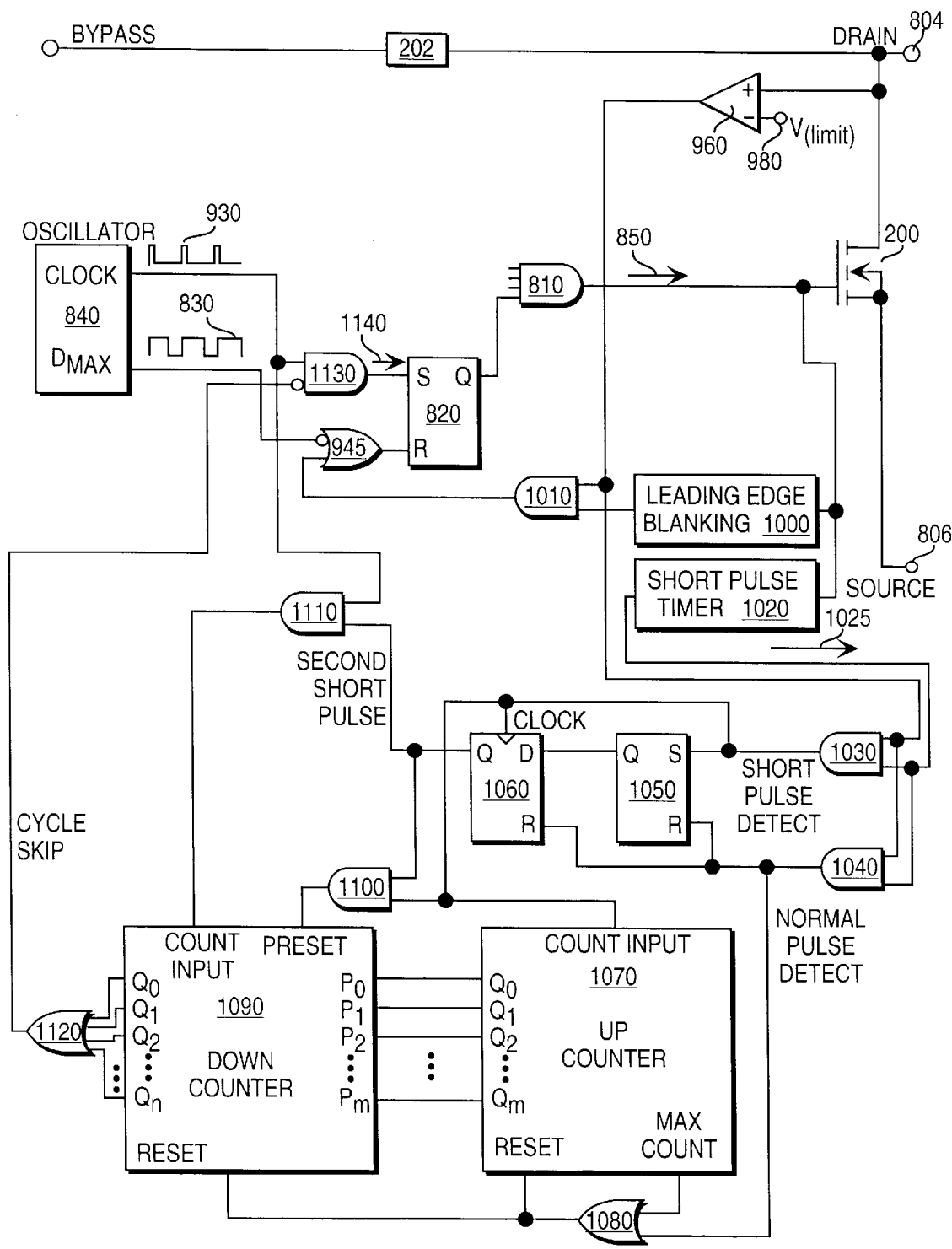
FIG. 11 is a diagram of alternate presently preferred reflected feedback regulation circuit that can be utilized with FIGS. 6 and 7 that utilizes pulse skipping to minimize power consumption according to the present inventions.

Referring to FIG. 11, short pulse signal 1025 provided by short pulse timer 1020 has a fixed period which is less than the time required to reach the current limit in any cycle of operation when the variable impedance 164 is in the substantially open circuit condition. And-gates 1030 and 1040 receive the output of short pulse timer 1020 and current threshold comparator 960. The output of and-gate 1030 will go high during the duration of short pulse signal 1025 and when the current limit is exceeded. Conversely, the output of or-gate 1040 will go high if the current limit is reached outside of the duration of short pulse signal 1025. This output will be provided to latch 1050 and flip-flop 1060. Flip flop 1060 will be set and therefore preset downcounter 1090 when the output of latch 1050 and and-gate 1030 are high. Up counter 1070 will be incremented when the current limit is reached within the period of short pulse signal 1025. Upcounter 1070 will be incremented every time the current limit threshold is reached within the period of short pulse signal 1025. Upcounter 1070 will load its state into downcounter 1090 every time it is incremented itself. Downcounter 1090 will provide a signal to or-gate 1120 so long as the count of downcounter 1190 is not zero. The output of or-gate 1120 will be high so long as the downcounter 1090 provides output. When the output of or-gate 1120 is high the output signal of and-gate 1130 will be low at the beginning of each cycle of operation of the oscillator. This will in turn not set latch 820, which will prevent drive signal 850 from being provided and maintain switch 200 off even when oscillator clock cycle signal 830 is high during each clock cycle.

The duration of short pulse signal 1025 is dependent on the expected period required for the primary winding current 180 to reach the current limit threshold when the variable impedance 164 is in the substantially short circuit condition.

Figure 12:
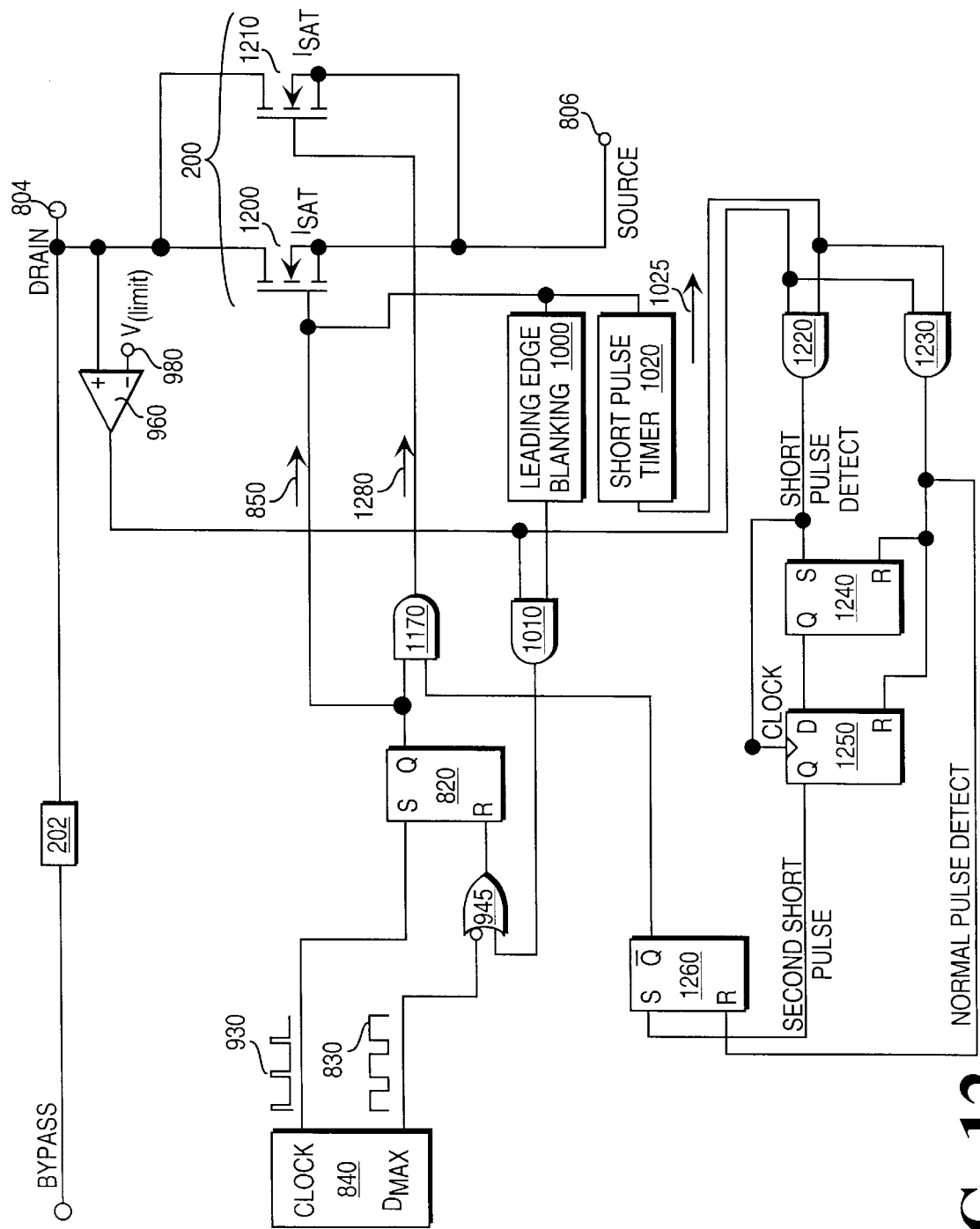
FIG. 12 is a diagram of another alternate presently preferred reflected feedback regulation circuit that can be utilized with FIGS. 6 and 7 that reduces the switch saturation current to minimize power consumption according to the present inventions.

Referring to FIG. 12, and-gates 1220 and 1230 receive the output of short pulse timer 1020 and current threshold comparator 960. The output of and-gate 1220 will go high during the duration of short pulse signal 1025 and when the current limit is exceeded. The output of and-gate 1230 will go high if the current limit is reached outside of the duration of short pulse signal 1025. The output of latch 1240 will go high when the output of and-gate 1220 is high and the output of and-gate 1230 is low. After two cycles where the current limit is reached within the period of short pulse signal 1025 latch 1260 will be pulled low by flip-flop 1250 which terminates the second drive signal 1280 provided by and-gate 1270. The termination of second drive signal 1280 will terminate conduction of second MOSFET 1210 of the switch 1200. Since the saturation current is a sum for the saturation currents of the first MOSFET 1200 and the second MOSFET 1210, the turning off of the second MOSFET 1210 will reduce the saturation current of the switch 200. The saturation current is equal to the maximum primary winding current 180 that can flow in the primary winding 158, which also reduces the maximum magnitude of the current that during the blanking time of leading edge blanking. Thus the power consumption of the power supply is reduced when the output voltage, current or power is above the desired threshold level.

Figure 13:
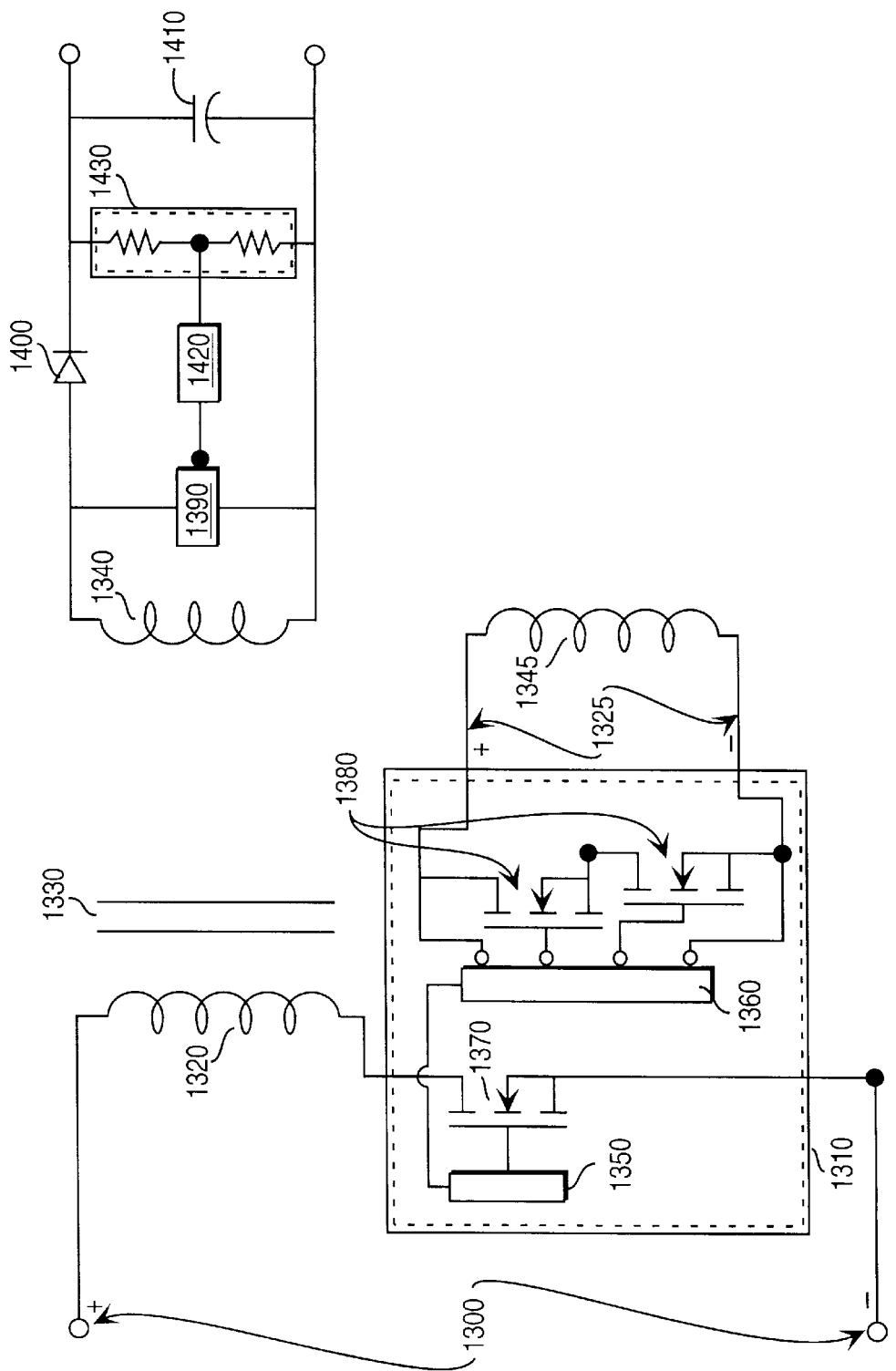
FIG. 13 is circuit diagram of an alternate power supply utilizing reflected feedback according to present invention.

Many power supplies operate in a discontinuous conduction mode where at least a portion of each cycle no energy is either being input into or supplied by the coupled inductor. During this time no energy is being transferred between the windings. The amount of time that portion of the cycle when no energy being input into or supplied by the coupled inductor is dependent on the magnitude of the load that the power supply is supplying. In many applications the maximum load is set by the manufacturer, and in fact the supply has a maximum load for which it is designed. This allows a designer of the power supply to know the minimum length of the portion of the cycle where no energy is either being input into or supplied by the coupled inductor Referring to FIG. 13, a power supply, which can either be an AC to DC power supply or a DC to DC converter, that operates in a discontinuous conduction mode is depicted. A substantially DC voltage 1300 causes a current to flow in primary winding 1320 of coupled inductor 1330 when multiple switch reflected feedback regulation circuit 1310 allows switch 1370 to conduct. Coupled inductor 1330 induces a current and voltage in the secondary winding 1340 when no current is flowing through the primary winding 1320. The coupled inductor 1330 will cease to induce current and voltage in the secondary winding 1340 after a period of time the flux that is stored in the coupled inductor 1330 as result of the current that flowed through the primary winding 1320 is essentially zero.

In each cycle after the flux is substantially zero and prior to the beginning of conduction by the switch 1370, auxiliary switches 1380 are switched on and off at a high frequency by the auxiliary switch control circuitry 1360, that provides a low amplitude high frequency signal to the auxiliary winding 1345. Auxiliary switch control circuitry 1360 can know the time to begin switching by using its own clock which is synched to the clock of the control circuitry 1350 or by sensing the voltage on primary winding 1320. During this time period error detection circuit 1420 determines the level of the output current, voltage or power. In the embodiment of FIG. 11, the error detection circuit 1420 determines the magnitude of the output voltage by using a voltage divider 1430. The error detection circuit 1420 then can provide a signal indicative of a difference between the magnitude of the output voltage and some reference level to the variable impedance 1390, which can change its value depending on the difference.

The third winding voltage 1325 will vary with the secondary winding current and thus can relay information to the control circuitry 1360 regarding the magnitude of variable impedance 1390 to the control circuitry 1350. The control circuitry 1350 can then determine whether and for how long to leave switch 1370 on during the following cycle in order to maintain the output voltage at the predetermined threshold.

The reflected feedback regulation circuit 182 and multiple switch reflected feedback regulation circuit 1310 are presently preferred to comprise monolithic devices. It is also presently preferred that variable impedance, error detection circuit, secondary diode and capacitor comprise a monolithic device. Further it is possible that both monolithic devices for the primary and secondary components reside on a single package. The package would require the proper isolation between the secondary and primary components. The inclusion of the primary and secondary components on one package would greatly decrease the number of components required for one power supply and reduce the power supply cost.

While the embodiments, applications and advantages of the present invention have been depicted and described, there are many more embodiments, applications and advantages possible without deviating from the spirit of the inventive concepts described herein. Thus, the inventions are not to be restricted to the preferred embodiments, specification or drawings. The protection to be afforded this patent should therefore only be restricted in accordance with the spirit and intended scope of the following claims.

What is claimed is:

1. A power supply for supplying power to a load comprising:
    a coupled inductor having a primary winding and at least one secondary winding;
    a regulation circuit coupled to the primary winding, the regulation circuit allowing current or voltage to be supplied to the coupled inductor for a time duration;
    an error detection circuit coupled to the secondary winding to compare a voltage or current supplied to the load against at least one threshold, when the at least one threshold has been exceeded the error detection circuit altering the voltage or current at the secondary winding, which causes a reflected feedback signal to be generated; and
    reflected feedback regulation circuit coupled to the primary winding and to the regulation circuit, the reflected feedback regulation circuit providing an information signal to the regulation circuit responsive to the reflected feedback signal, the information signal increasing or decreasing the time duration to regulate the power supplied to the load.

2. The power supply of claim 1 further comprising:
    a filter circuit coupled to the secondary winding to maintain the voltage or current supply to the load in a substantially D.C. state.

3. The power supply of claim 1 wherein the regulation circuit comprises a switch that operates according to a pulse width modulation signal.

4. The power supply of claim 1 wherein the at least one threshold comprises an upper limit threshold and a lower limit threshold.

5. The power supply of claim 1 wherein the reflected feedback circuit compares a magnitude of a primary winding current with a reference level, the reflected feedback regulation circuit ceasing conduction to prevent energy from being further input to the coupled inductor when the magnitude of the primary winding current is above the reference level.

6. The power supply of claim 1 wherein the power supply operates in either a continuous conduction mode or a discontinuous conduction mode.

7. The power supply of claim 1 wherein the reflected feedback signal is received by on the primary winding.

8. The power supply of claim 1 wherein the coupled inductor further comprises an auxiliary winding, the reflected feedback signal being received by the reflected feedback regulation circuit through the auxiliary winding.

9. A power supply for supplying power to a load comprising:
 a coupled inductor having a primary winding and at least one secondary winding;
 an error detection circuit coupled to the secondary winding to compare a voltage or current supplied to the load against a predetermined threshold, when the predetermined threshold has been exceeded the error detection circuit altering the voltage or current at the secondary winding, which causes a reflected feedback signal to be generated;
 a reflected feedback regulation circuit coupled to the primary winding to control a primary winding current responsive to the reflected feedback signal, the reflected feedback regulation circuit comparing a magnitude of the primary winding current with a reference level and changing to a non-conduction state to lower the primary winding current when the magnitude of the primary winding current is above the reference level.

10. The power supply of claim 9 further comprising:
 a variable impedance element coupled across the secondary winding, the variable impedance element switching to a first impedance condition responsive to the error detection circuit detecting that an output feedback signal of the power supply is above the predetermined threshold level, and to a second impedance condition responsive to the error detection circuit detecting that the output feedback signal of the power supply is below the predetermined threshold level.

11. The power supply of claim 10 wherein the first impedance condition is a substantially short circuit, and the second impedance condition is a substantially open circuit.

12. The power supply of claim 11 wherein the reflected feedback regulation circuit comprises:

a MOSFET that switches between the conduction state and the non-conduction state according to a duty cycle;
 control circuitry to provide a drive signal that establishes the duty cycle;
 current limit circuitry to provide a current signal to the control circuitry when the magnitude of the primary winding current exceeds the reference level, the control circuitry removing the drive signal responsive to the current signal, which causes the MOSFET to switch to the non-conducting state.

13. The power supply of claim 12 wherein the MOSFET remains in the non-conducting state until a next cycle of the reflected feedback regulation circuit.

14. A method of supplying power to a load comprising:
 providing a primary winding current to a primary winding of a coupled inductor to increase a core flux of the coupled inductor;
 transferring energy stored in the core flux to a secondary winding of the coupled inductor;
 comparing a voltage or current supplied to the load against a predetermined threshold;
 generating a reflected feedback signal by altering the voltage or current at the secondary winding when the predetermined threshold has been exceeded;
 changing a conduction state of a switch coupled to the primary winding responsive to the reflected feedback signal to regulate the power supplied to the load.

15. The method of claim 14 wherein the changing step comprises:
 comparing a magnitude of the primary winding current with a reference level;
 changing the switch to a non-conduction state to lower the primary winding current when the magnitude of the primary winding current is above the reference level.

16. The method of claim 14 further comprising:
 generating a first signal when an output feedback signal of the power supply is above a predetermined threshold level;
 switching a variable impedance element coupled across the secondary winding to a first impedance condition responsive to the first signal;
 generating a second signal when the output feedback signal of the power supply is below a predetermined threshold level; and
 switching the variable impedance element to a second impedance condition responsive to the second signal.

17. The method of claim 16 wherein the first impedance condition is a substantially short circuit, and the second impedance condition is a substantially open circuit.

* * * * *

UNITED STATES PATENT AND TRADEMARK OFFICE
CERTIFICATE OF CORRECTION

PATENT NO. : 5,973,945
DATED : October 26, 1999
INVENTOR(S) : Balakrishnan et al.

It is certified that error appears in the above-identified patent and that said Letters Patent is hereby corrected as shown below:

In the drawings, Sheet 4, Fig. 4, replace "REFLECTED FEEDBACK DETECTION CIRCUIT 114" with --ERROR SIGNAL DETECTION CIRCUIT 128--.

Claim 1, col. 12, line 54, please replace "reflected" with --a reflected--.

Claim 7, col. 13, line 15, please replace "received by on" with --received by--.

Signed and Sealed this

Twenty-eighth Day of November, 2000

Attest:

Q. TODD DICKINSON

*Attesting Officer*  *Director of Patents and Trademarks*